Jan. 5, 1943. O. C. MARTIN 2,307,328
SWIVEL FITTING
Filed April 19, 1941
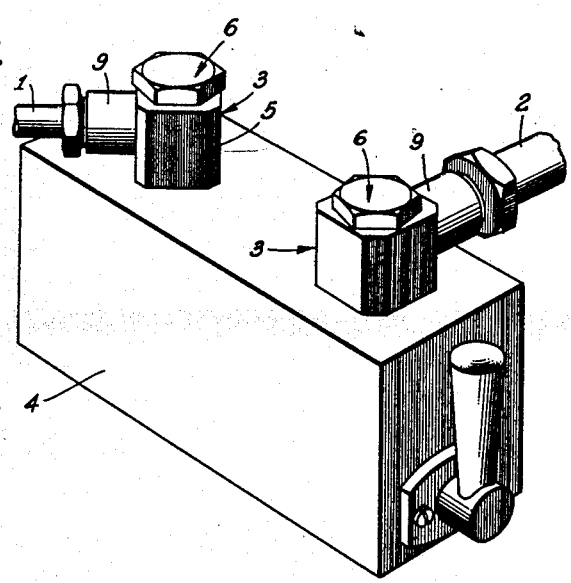
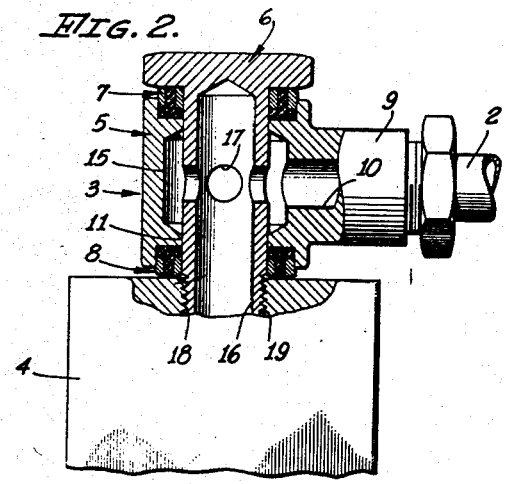
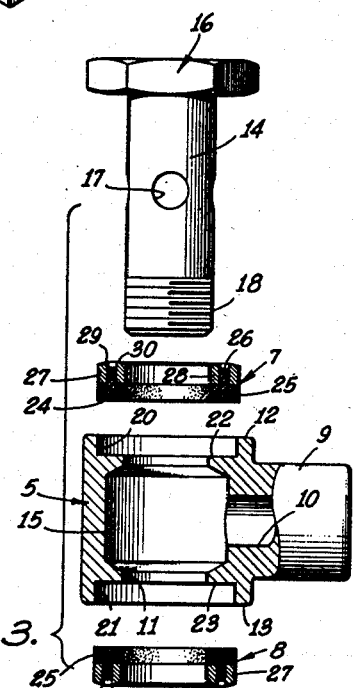
OTIS C. MARTIN,
INVENTOR:
BY *Harold W. Mattingly*
ATTORNEY Patented Jan. 5, 1943

2,307,328

UNITED STATES PATENT OFFICE 2,307,328

SWIVEL FITTING

Otis C. Martin, Los Angeles, Calif.

Application April 19, 1941, Serial No. 389,341

9 Claims. (Cl. 285—96.3)

My invention relates to a tubing fitting and has particular reference to a fitting of the universal or swivel type by means of which an interconnection may be effected between a valve or other similar fitting or apparatus and a tubing which may be disposed at an odd angle to such valve or other apparatus.

In many fluid power systems it is necessary to establish an interconnection between a tubing and a valve or other apparatus when the tubing is disposed at right angles to the entrance port in the apparatus. Elbow fittings are normally used for this purpose but are highly unsatisfactory where relatively high pressure fluids are to be confined. To provide an adequate fluid seal ordinary elbow fittings must be screwed into the valve or other apparatus until the threads are made up tight and this invariably disposes the free arm of the fitting at an odd angle such that the tubing line can not be connected thereto. The fitting must then be screwed even tighter (with the danger of stripping the threads) or loosened (with the danger of causing leaks around the threads) in order to so position the free arm of the elbow as to permit the attachment thereto of the tubing line.

To overcome these disadvantages resort is often had to a swivel fitting or universal fitting in which a fitting body is secured to the valve or other apparatus by means of a hollow bolt, thus permitting the body to be positioned as desired and then secured by tightening the bolt.

To provide a fluid seal between the body and the bolt and between the body and the apparatus copper washers are used and the surfaces between which the washers are clamped are provided with a series of annular ridges or teeth which bite into the washer to provide the necessary seal.

This type of universal fitting has also failed to give complete satisfaction because it is necessary to machine or otherwise form the circular ridges or teeth upon the valve or fluid pressure device with which the fitting is to be used and this is a costly and time consuming operation. Furthermore, once the fitting has been loosened as for the purpose of making repairs or adjusting the position of the fitting body, it is impossible to again establish an adequate fluid seal without first replacing the copper washers. Furthermore, the force with which the anchor bolt is oftentimes tightened is sufficient to distort or damage the ring-like teeth which are formed on the fluid pressure device, thus making it impossible to establish the desired fluid seal and requiring the discarding of the relatively expensive fluid pressure device and the installation of an entirely new device because of an inadequate and unsatisfactory fitting. In many instances the replacement of the fluid pressure device because of injury to the annular teeth which are formed thereon and resulting either from other pieces of equipment accidentally coming into contact with these ridges or from an excessive tightening of the anchor bolt is extremely difficult and costly because of the manner in which such device is constructed or connected into the fluid pressure system.

It is, therefore, an object of my invention to provide a swivel or universal fitting for use with tubing lines which overcomes the above noted disadvantages by employing an elastic sealing material between the anchor bolt and the body and between the body and the apparatus to which the fitting is attached.

It is also an object of my invention to provide a fitting of the character set forth in the preceding paragraph in which an elastic material is axially compressed by the anchor bolt and thereby expanded radially into sealing relation between the bolt and the fitting body.

It is an additional object of my invention to provide a fitting of the character set forth in the preceding paragraphs in which a triple seal is effected between the body and the anchor bolt and between the body and the apparatus to which the fitting is attached, the triple seal comprising a pair of spaced apart metal to metal seals between which is disposed an elastic sealing material held in high pressure engagement with the bolt or apparatus.

It is a still further object of my invention to provide a fitting of the character set forth in the preceding paragraphs in which is included a means for engaging and penetrating the surface of the fluid pressure device to which the fitting is secured, thereby forming a new and adequate metal to metal seal between the fitting and the device each time the anchor bolt is tightened.

Other objects and advantages of my invention will be apparent from a study of the following specifications, read in connection with the accompanying drawing, wherein:

Fig. 1 is a perspective view illustrating the appearance of a pair of swivel fittings constructed in accordance with my invention and illustrating the manner in which such fittings may be employed to secure tubing lines to valves or similar pieces of apparatus;

Fig. 2 is a fragmentary vertical section through the fitting illustrated in Fig. 1; and Fig. 3 is an exploded sectional view illustrating the relative positioning and manner of assembly of the parts comprising the swivel fitting.

Referring to the drawing, I have illustrated in Fig. 1 a pair of tubing lines 1 and 2 as being connected by means of universal or swivel fittings 3 into the body 4 of a fluid control valve or other fluid fitting or apparatus. The swivel fitting 3 comprises four main elements; a fitting body 5, an anchor bolt 6, and upper and lower sealing assemblies 7 and 8.

The fitting body 5 includes a laterally extending boss portion 9 which provides means for attachment to the fluid lines 1 or 2. This attaching means may comprise any suitable tubing connector but I prefer to employ a connector construction such as that described and claimed in my copending application Serial No. 341,856, filed June 22, 1940, and entitled "Tube coupling."

The boss member 9 is provided with a fluid passage 10 which intersects a vertically extending bolt receiving bore 11 extended completely through the fitting body 5 between opposite faces 12 and 13 thereof. The bore 11 preferably closely conforms in diameter to the exterior diameter of the shank portion 14 of the anchor bolt 6 and is provided with a central enlargement 15 permitting fluid which enters the fitting body through the passage 10 to surround the shank portion 14 of the bolt 6.

The bolt 6 is hollow, being provided with an internal bore 16 which is adapted to receive fluid from the enlargement 15 through suitable transverse apertures 17 formed in the shank portion 14. The lower end of the shank portion 14 is threaded as indicated at 18 to provide a threaded connection with suitably formed threads provided in a fluid passage bore 19 which is formed in the valve body 4 or other apparatus.

The bolt receiving bore 11 is also preferably counter-bored inwardly from each of the faces 12 and 13 to provide corresponding cylindrical enlargements 20 and 21 terminating, respectively, in radially extending shoulders 22 and 23. The annular ring-like space defined by the counter-bores 20 and 21 and the shank portion 14 of the bolt 6 serve to receive the upper and lower sealing assemblies 7 and 8. Each of these assemblies is preferably identical and includes a sealing ring 24 of a suitable elastic sealing material, a synthetic oil-resistant rubber compound such as "Neoprene" being preferred to ordinary natural rubber compounds because of the increased strength, life and resistance to deterioration by the action of such fluids as oils and gasolines.

The elastic sealing ring 24 is preferably formed with a T-shaped cross section, the horizontal bar portion 25 of the T having a radial width substantially equal to the radial width of the shoulder 22. On either side of the leg portion 26 of the T-shape, I dispose rigid sealing rings 27 and 28, these rings preferably being formed of a relatively hard metal. The rings 27 and 28 are of equal axial length, which length preferably slightly exceeds the axial length of the leg portion 26 of the T-shape. The inner surfaces of the rings 27 and 28 are preferably radial planes providing a smooth and uniform contacting area with the horizontal bar portion 25 of the T-shaped sealing ring, whereas, the outer edges of each of the rings 27 and 28 are preferably chamfered inwardly and away from the leg portion 26 of the T-shape to provide relatively sharp outwardly directed edges 29 and 30.

The sealing ring assemblies are positioned in the annular recesses 20 and 21 in the manner illustrated in Fig. 2 whereupon tightening of the anchor bolt 6 serves to squeeze the sealing assemblies 7 and 8 between the anchor bolt 6 and the body portion 5 and the body 4 of the valve or other apparatus. This results in an axial compression of the bar portion 25 of the T-shaped elastic sealing ring with the result that this bar portion is expanded radially into sealing engagement with the shank portion 14 of the anchor bolt 6 and also with the cylindrical walls 20 and 21 of the counter-bores.

This fluid seal alone will prevent fluid leakage under relatively high pressure. However, as the bolt 6 is tightened, the relatively sharp edges 29 and 30 tend to bite into the under side of the head of the bolt and also into the upper surface of the body 4 of the valve or other apparatus so as to provide a pair of spaced apart metal to metal annular seals. These seals are augmented by a third elastic seal resulting from the axial expansion of the leg portion 26 of the T-shaped elastic sealing ring into pressure engagement with the same surface with which the edges 29 and 30 are engaged.

I have found that this triple seal is so effective as to permit the confining of pressures in the order of one thousand pounds per square inch without requiring the exertion of undue force on the anchor bolt 6.

Attention is directed particularly to the fact that the tightening of the anchor bolt 6 causes the sharp edges 29 and 30 of the hard metal rings 27 and 28 to bite into and penetrate below the under surface of the head of the anchor bolt 6 and the surface of the fluid pressure device with which they are brought into engagement. Thus, every tightening of the anchor bolt following a loosening thereof serves to form entirely new and independent metal to metal seals so that the difficulties encountered in previous constructions and resulting from the deformation or destruction of the metal seal as a result of a tightening operation are avoided.

It is to be noted further that the device of my invention provides an adequate fluid seal without requiring the forming of ridges, teeth or similar protuberances on the face of the fluid pressure device to which the fitting is attached, thus avoiding a construction difficulty which, before my invention, resulted in a considerable increase in the cost of manufacturing and maintaining fluid pressure devices to which such fittings were attached.

Attention is directed to the fact that the swivel fitting above described is simple in construction, it being feasible to form the bolt receiving bore 11, the radial shoulders 22 and 23 and the annular recesses 20 and 21 in a single machining operation, whereas the enlargement 15 may be provided at a second operation. A third operation may provide the bore 10 and such enlargements thereof as may be necessary to provide the connection to the incoming tubing line. The elastic rings 24 are preferably identical and may be formed in quantities and at low cost by a suitable molding operation. The same is true of the rigid sealing rings 27 and 28, the upper and lower pairs of which are preferably identical and interchangeable.

From the foregoing it will be observed that I have provided a fitting which overcomes numerous disadvantages found in the presently available types of swivel or universal fittings and that the fitting of my invention in addition to overcoming these disadvantages is so constructed and arranged as to permit its ready and rapid manufacture at low cost.

While I have shown and described the preferred embodiment of my invention, I do not desire to be limited to any of the details of construction shown or described herein, except as defined in the appended claims.

I claim:

1. In a universal tubing fitting for interconnecting a tubing line and a fluid pressure device, the combination of: a fitting body having a fluid passage formed therein and including means for attachment to said tubing line; means for securing said body to said device; and sealing means interposed between said body and said device including means carried by said body for engaging and penetrating said device, and an elastic sealing member compressed between said body and said device.

2. In a universal tubing fitting for interconnecting a tubing line and a fluid pressure device, the combination of: a fitting body having a fluid passage formed therein and including means for attachment to said tubing line; sealing means interposed between said body and said device including a hard sharp-edged member carried by said body for engaging and penetrating said device, and an elastic sealing member disposed between said body and said device; and means inter-engaging said body and said device for securing said body to said device and for producing sufficient compressive force to cause said sharp-edged member to penetrate the surface of said device and to compress said elastic sealing member.

3. In a universal tubing fitting for interconnecting a tubing line and a fluid pressure device, the combination of: a fitting body having a fluid passage formed therein and including means for attachment to said tubing line; a hollow anchor bolt passed through said passage for securing said body to said device and for providing a fluid interconnection between said passage and said device; and sealing means interposed between said body and said device including a hard sharp-edged ring member carried by said body for engaging and penetrating said device upon tightening of said anchor bolt, and an elastic sealing ring surrounding said bolt within said ring member and disposed between said body and said device, said sealing ring being so constructed and arranged as to be axially compressed by tightening of said anchor bolt and thereby expanded radially into sealing relation with said body, ring and device.

4. In a universal tubing fitting for interconnecting a tubing line and a fluid pressure device, the combination of: a fitting body having a fluid passage formed therein and including means for attachment to said tubing line; a hollow anchor bolt passed through said passage for securing said body to said device and for providing a fluid interconnection between said passage and said device; and sealing means interposed between said body and said device including a pair of concentrically disposed hard sharp-edged ring members carried by said body for engaging and penetrating said device upon tightening of said anchor bolt, and an elastic sealing ring interposed between said sharp-edged ring members and disposed between said body and said device, said sealing ring being so constructed and arranged as to be axially compressed by tightening of said anchor bolt and thereby expanded radially into sealing relation with said body, rings and device.

5. In a universal tubing fitting for interconnecting a tubing line and a fluid pressure device, the combination of: a fitting body having a fluid passage formed therein and including means for attachment to said tubing line; a hollow anchor bolt passed through said passage for securing said body to said device and for providing a fluid interconnection between said passage and said device; and sealing means interposed between said body and said device including a separate hard sharp-edged ring member mounted on said body for axial sliding movement relative thereto, an elastic sealing ring interposed between said body and said device and including a portion interposed between said ring member and said body, and means for radially confining said sealing ring, whereby tightening said anchor bolt causes said sharp-edged ring member to penetrate said device and axially compresses said sealing ring into sealing engagement with said device and thereby radially expands said sealing ring into sealing relation between said body and said sharp-edged ring member.

6. In a universal tubing fitting for interconnecting a tubing line and a fluid pressure device, the combination of: a fitting body including means for attachment to said tubing line and having a bolt receiving bore formed therein extending from one face to the other of said body, said bore having a central enlargement and having a shouldered counter-bore extending inwardly from each of said faces; a hollow anchor bolt in said bore; and a sealing assembly carried in each of said counter-bores, each of said assemblies comprising a ring of elastic material of T-shaped cross section disposed with the top of said T-shape against said shoulders, and a pair of hard metal rings disposed on opposite sides of the leg of said T-shape, each of said rings having an axial length slightly greater than the length of said leg and the outer surface of each of said rings being sloped inwardly and away from said leg.

7. In a universal tubing fitting for interconnecting a tubing line and a fluid pressure device, the combination of: a fitting body having a fluid passage formed therein and including means for attachment to said tubing line; means for securing said body to said device; an elastic sealing member compressed between said body and said device; and means carried by said body extending circumferentially about said sealing member for confining said sealing member against radial outward movement, said last named means being engaged with and penetrated below the surface of said device.

8. In a universal tubing fitting for interconnecting a tubing line and a fluid pressure device, the combination of: a fitting body having a fluid passage formed therein and including means for attachment to said tubing line; means for securing said body to said device; an elastic sealing ring compressed between said body and said device; and means carried by said body for radially confining said sealing ring, said last named means comprising a pair of concentric sharp edges disposed on opposite sides of said sealing ring and penetrating the surface of said device.

9. In a universal tubing fitting for interconnecting a tubing line and a fluid pressure device, the combination of: a fitting body having a fluid passage formed therein and including means for attachment to said tubing line; a hollow, headed anchor bolt passed through said passage for securing said body to said device and for providing a fluid interconnection between said passage and said device; a sealing assembly interposed between said body and the surface of said device and between said body and the under surface of the head of said anchor bolt, each of said assemblies comprising a hard sharp-edged ring member carried by said body for engaging and penetrating said surface upon tightening of said anchor bolt, and an elastic sealing ring surrounding said bolt within said ring member and disposed between said body and said surface, said sealing ring being so constructed and arranged as to be axially compressed by tightening of said anchor bolt and thereby expanded radially into sealing relation with said body, ring and surface.

OTIS C. MARTIN.